United States Patent Office 3,492,494
Patented Jan. 27, 1970

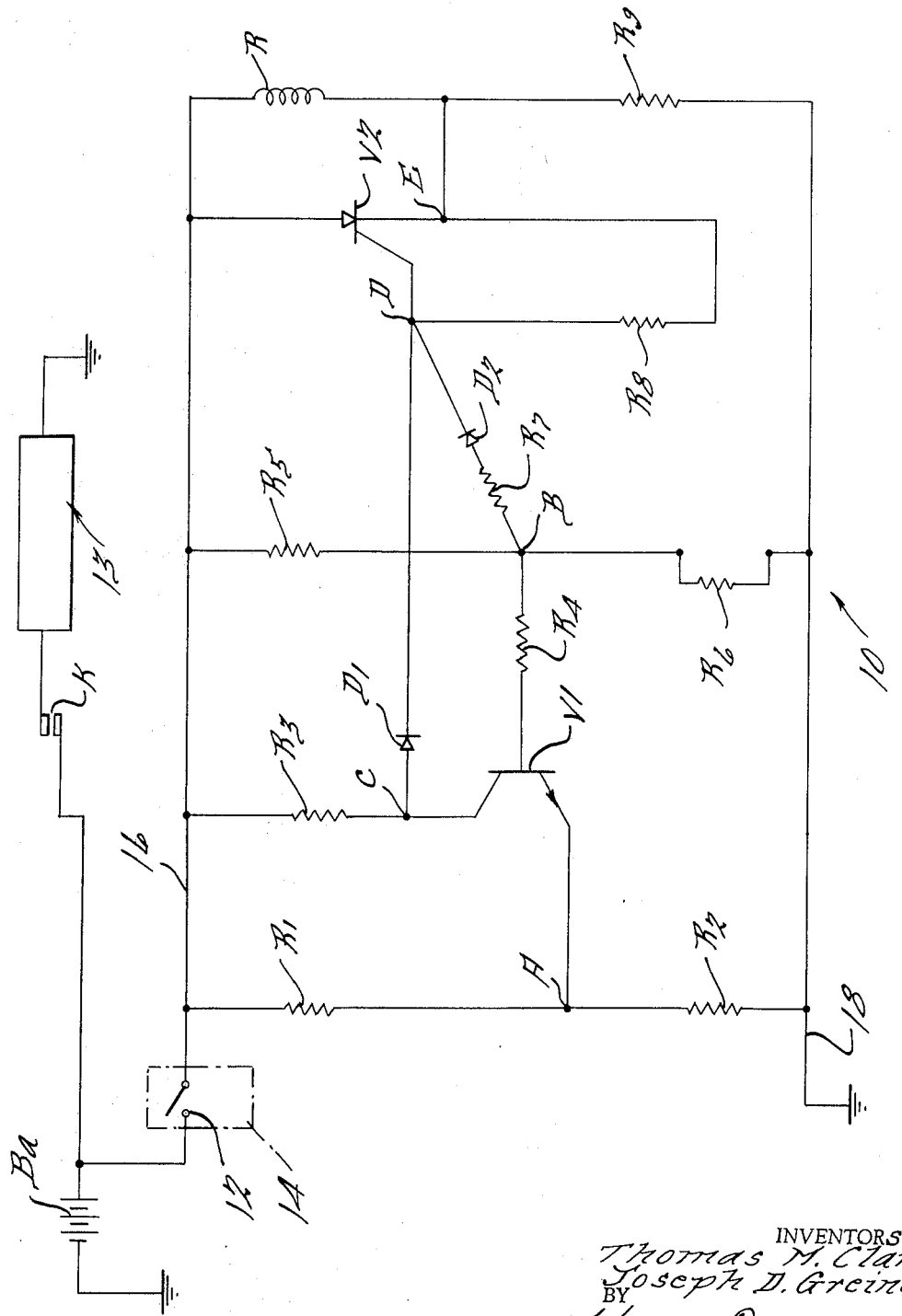

3,492,494
ANTI-THEFT ELECTRONIC SWITCH
Thomas M. Clark, 542 Pemberton, and Joseph D. Greiner, 625 Middlesex, both of Grosse Pointe Park, Mich. 48236
Filed May 17, 1967, Ser. No. 639,177
Int. Cl. H02b 1/24
U.S. Cl. 307—10         18 Claims

ABSTRACT OF THE DISCLOSURE

An electronic switching circuit utilizing an electrical resistance in conjunction with a key for controlling the energization of the starting circuit of an engine for a vehicle driven thereby.

---

The present invention relates to electronic switches for controlling the operation of vehicles.

The electronic switch of the present invention can be used in conjunction with the starting circuit for the engine of a vehicle and more specifically with key-actuated starting circuits and functions as an anti-theft device since it prevents the operation of the vehicle by the mere use of a conventional ignition key; the switch also controls the energization of the starting circuit of the engine of the vehicle and prevents engine starting by an external connection (such as a jumper wire) of the ignition system.

It is contemplated in one form of the present invention that energization of the starting circuit is controlled by the electronic switch.

The form of the invention is such that it can be easily used in conjunction with a conventional ignition key.

In the invention shown and described, the electronic switch could be used to control the ignition circuit of an engine, the circuit to the starter motor for the engine, or some other circuit required for the operation of the vehicle.

The electronic switching circuit is tamper proof and is operable in response to an external impedance of a preselected magnitude. In utilizing the switching circuit the operator of the vehicle would be provided with a key or some other type of actuating device which included the preselected or proper impedance; it would be impossible to operate the vehicle with a key device alone and likewise, it would be impossible to operate the vehicle merely with an impedance device alone; a combination of the proper key and proper impedance would be required. In addition, the electronic circuit of the present invention provides means for locking out the system if an impedance having the incorrect magnitude is utilized. This feature provides an additional safeguard against thefts.

Therefore, it is an object of the present invention to provide an electronic switch for controlling the starting circuit of the engine of a vehicle.

It is another object of the present invention to provide an electronic switch for operation in conjunction with the starting circuit of an engine of a vehicle whereby the engine can be started only by use of a key device in conjunction with an electrical impedance of a preselected magnitude.

It is still another object of the present invention to provide an electronic switch of the above described type for use with a starting circuit of an engine of a vehicle in which the circuit is tamper proof and in which utilization of an impedance of improper magnitude will result in the switch being locked out and rendered inoperative requiring it to be reset again.

Other objects, features, and advantages of the present invention will become apparent from the subsequent description and the appended claims, taken in conjunction with the accompanying drawing which is generally an electrical schematic diagram of a circuit embodying the features of the present invention.

Looking now at the drawing, the electronic switch is generally indicated by the numeral 10 and is utilized in conjunction with the electrical circuitry of the vehicle, such as an automobile, which circuitry is generally indicated by the numeral 13. The circuitry 13 could be the circuit for the ignition system or could be the circuit to the starting solenoid for the starting motor of the engine, or could be the circuitry to the distributor, the coil or to some other part of the circuit controlling the starting of the engine and/or the operation of the vehicle with which it is associated and hereinafter it will be simply designated as "starting circuit 13." The starting circuit 13 and switch 10 are energized by direct current from a battery B$a$, associated with the vehicle. The starting circuit 13 connected to battery B$a$ is in series with a pair of relay contacts K which are normally opened and which are closed by energization of an associated relay coil R. With the contacts K normally open, electrical energy from the battery B$a$ cannot be delivered to the starting circuit 13 and hence it will be impossible for the engine to start, etc. Upon energization of relay coil R, however, the contacts K will close whereby the starting circuit 13 will be energized. The energization of the relay R is controlled by the remainder of the electronic switch circuitry 10 in a manner to be described.

The electronic switch circuit 10 is energized from the battery B$a$ and has a positive conductor 16 connected to the positive side of battery B$a$ through a set of the contacts 12 associated and mechanically actuated with an ignition switch 14 (indicated by dotted lines) for the engine of the vehicle. The switch 14 can be of the key-actuated type. The contacts 12 are normally open and will be closed upon actuation of the ignition switch 14 by the key in the conventional manner. A ground conductor 18 is connected to the negative side of battery B$a$.

The electronic switch 10 includes a transistor V1 which is of the NPN type having its emitter connected to a point A, which is at the junction of a pair of resistors R1 and R2 which are connected across conductors 16 and 18 in the form of a voltage divider network. The collector of transistor V1 is connected to the positive conductor 16 by means of a load resistor R3. A biasing resistor R4 connects the base of transistor V1 to a point B which point B is at the intermediate point in a voltage dividing network comprising resistors R5 and R6 which are serially connected between conductors 16 and 18. The parameters of the resistors R1 through R6 are selected such that the transistor V1 is normally conductive when the contacts 12 of the ignition switch 14 are closed. Resistor R6 is not an integral part of the circuit 10 but is associated with and can be a part of the ignition key or of some type of keying device. Thus, the insertion of resistor R6 in the circuit 10 will be controlled by the operator. The parameters of the circuit, including the values of the resistances R1 through R5, are selected such that if a resistor having a magnitude substantially greater (or open circuit) than the preselected value of resistor R6 is inserted into the circuit, then transistor V1 will be maintained conductive. However, a first signal will be provided at the point B in the form of a voltage rise since an increase in resistance at the R6 connection will increase the potential at point B. The point B is connected to a point D at a gate electrode of an SCR V2 by means of a series circuit including resistor R7 and a diode D2. The cathode of the SCR V2 is connected to a point E at the juncture of the connection between the relay coil R and a dropping resistor R9; the relay coil R and resistor R9 are serially connected across conductors 16 and 18. Thus, the potential at point D is raised when a resistor having a magnitude greater than the selected magnitude of resistor R6 is used. When the potential at point D is increased sufficiently whereby sufficient current will flow through the gate cathode circuit of the SCR V2 to the ground conductor 18 through the dropping resistor R9, the SCR V2 will be rendered conductive. With the SCR V2 conductive, the relay coil R will be shunted out of the circuit and cannot be actuated; thus, when a resistance of a magnitude greater than the preselected magnitude of resistance R6 is inserted in the circuit in place of resistance R6, the relay coil R cannot be energized. With the relay coil R deenergized, relay contacts K cannot be closed and hence electrical energy to the starting circuit 13 cannot be received from the battery Ba and hence the engine of the vehicle cannot be started. A resistor R8 connected between gate and cathode (points D and E) of SCR V2 can be selected to set the firing point of SCR V2. Note that the characteristics of the SCR V2 are such that once it is triggered and rendered conductive it will remain conducting until the potential across the anode and cathode is removed. Thus, as long as the contacts 12 of the ignition switch 14 remain closed, the SCR V2 will keep the relay coil R deenergized and contacts K open. Thus the electronic switch 10 provides for a locking out feature if a resistance of a magnitude greater than the selected resistance of R6 is utilized. A similar lockout feature is provided for resistances less than the preselected magnitude of R6.

A diode D1 is connected between point C, at the ground side of resistor R3 and the collector of the transistor V1, and point D at the gate electrode of the SCR V2. In the event that a resistance having a magnitude less than the preselected magnitude of the resistance R6 is inserted in the R6 position in the circuit or in the event that that portion is short circuited, then the potential at point B will be lowered sufficiently to render transistor V1 nonconductive. With V1 nonconductive a second signal will be provided in that the potential at point C will increase; when the increase is sufficient, current will flow through the diode D1 to the point D and through the gate cathode circuit of the SCR V2 rendering the SCR V2 conductive. With the SCR V2 conductive, the relay coil R will be short circuited and will maintain relay coil R deenergized and maintain the relay contacts K open.

If the proper magnitude of resistor R6 is inserted in the circuit, the transistor V1 will be rendered and maintained conductive whereby the potential of the point C will not be of sufficient magnitude to cause trigger current to flow through the gate-cathode circuit of the SCR V2; likewise, the potential at the point B will not be of sufficient magnitude to cause current to flow through the resistor R7 and diode D2 through the gate-cathode circuit SCR V2 to render it conductive. In this case then, current will flow through the relay coil R permitting it to be energized closing the relay contacts K whereby the battery Ba will then be connected to the starting circuit 13 and the engine of the vehicle can be started. The diodes D1 and D2 block the first and second signals from feeding back to transistor V1.

The switch circuit 10 is literally tamper proof. For example, a person attempting to start the engine of the vehicle strictly by means of a key alone and without the use of some external resistance (an open circuit at the position of resistor R6) will not be able to energize the relay coil R to close the contacts K and hence will not be able to energize the starting circuit 13. If the combination of a key and resistor is utilized and the ignition switch 14 is actuated whereby the contacts 12 are closed, unless the proper magnitude of resistance is inserted as a substitute for the resistor R6, as noted before, whether the resistance be too high or too low, the SCR V2 will be fired rendering the relay coil R inoperative.

Note that without a key to turn the ignition switch 14 on, the mere use of an external resistor would be insufficient to energize the electronic switch 10. Thus it would be impossible for an individual to use the combination of a key with a variable resistance to find the proper magnitude of resistance with any degree of efficiency. For example, assuming that the combination of a key which would be operable to close the ignition switch 14 and close the contacts 12 could be used in combination with a variable resistance which would be inserted in the position of the resistor R6 by an individual tampering with the system. For each improper magnitude of resistance value inserted in the R6 position, the SCR V2 would be energized resulting in the switch circuit 10 being locked out (since SCR V2 will continue to conduct until deenergized) necessitating the individual tampering with the system to open the ignition switch 14 to extinguish the SCR V2, reset the rheostat and repeat. Since the proper magnitude of R6 can be varied substantially for different units, it can be appreciated that the task of finding the correct one by use of a key and variable resistor would be literally impossible.

The circuitry of the electronic switch 10 is simple and relatively inexpensive and the use of the voltage divider network comprising the resistors R5 and R6 greatly facilitates the ease with which the circuitry can be utilized on a mass production basis. Thus, the value of R6 can be easily selected relative to the value of R5 to provide the proper potential at point B. The circuit parameters can be selected whereby a relatively narrow or wide range, as desired, of values of resistor R6 could be utilized.

It is contemplated that the electronic switch 10 would be encapsulated with a plastic coating hence further making tampering literally impossible; with the above circuit arrangement and with its features as described, it would be literally impossible to start the engine of a vehicle other than the proper key and external resistor R6 and hence vehicle thefts would be greatly reduced by the use of such a circuit.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a starting circuit for operating the engine of a vehicle and energizable from a source of electrical potential a switch comprising: first circuit means for controlling the energization of the starting circuit and having a first condition for permitting energization of the starting circuit and a second condition for preventing energization of the starting circuit, said first circuit means including sensing circuit means for sensing the magnitude of an electrical characteristic at a portion of its circuit and for placing said first circuit means in said first condition in response to an electrical characteristic of a predetermined magnitude, an external member selectively operable on said portion of the circuit of said sensing circuit means for providing said electrical characteristic of said predetermined magnitude, said sensing circuit means responsive to an electrical characteristic at said portion of its circuit of preselected magnitudes different from said predetermined magnitude for placing said first circuit means in said second condition, said first circuit means being energizable from a source of electrical potential and while energized being actuable for controlling the energization of the starting circuit, said first circuit means including blocking means responsive to said sensing circuit means sensing said preselected magnitudes for blocking said first circuit means from responding to subsequent changes in the magnitude of the electrical characteristic at said portion of said sensing circuit.

2. The circuit of claim 1 with said blocking means being taken out of said blocking condition upon deenergization and subsequent energization of said first circuit means.

3. The circuit of claim 2 with the electrical characteristic being an electrical impedance.

4. The circuit of claim 1 with the electrical characteristic being an electrical impedance and with said sensing circuit means being responsive to a preselected range of magnitudes of impedances for placing said first circuit means in said first condition and responsive to impedances having magnitudes out of said range for placing said first circuit means in said second condition.

5. The circuit of claim 4 with the electrical impedance being a resistance and with said sensing circuit means comprising a voltage divider network with the resistance provided by said external member forming a portion of said voltage divider network with the magnitude of said predetermined magnitude being selected in accordance with the magnitude of the resistance of the remainder of said voltage divider network.

6. The circuit of claim 5 with said first circuit means comprising actuable means for closing the circuit between the source of potential and the starting circuit with said first circuit means in said first condition and for opening the circuit between the source of potential and the starting circuit with said first circuit means in said second condition.

7. The circuit of claim 6 with said first circuit means being energizable from a source of electrical energy and while energized being actuable for controlling the energization of the starting circuit, the starting circuit including an ignition switch connected to said switch with said first circuit means being energized from the source of electrical energy by actuation of the ignition switch.

8. The circuit of claim 4 with said sensing circuit means providing a first signal in response to an impedance having a magnitude greater than the upper limit of said range and a second signal in response to an impedance having a magnitude less than the lower limit of said range and with said first circuit means being placed in said second condition in response to either said first or said second signal.

9. The circuit of claim 1 with the electrical characteristic being an electrical resistance and with said sensing circuit means being responsive to a preselected range of magnitudes of resistances for placing said first circuit means in said first condition and responsive to resistances having magnitudes out of said range for placing said first circuit means in said second condition, said sensing circuit means comprising a voltage divider network with the resistance provided by said external member forming a portion of said voltage divider network with the magnitude of said predetermined magnitude being selected in accordance with the magnitude of the resistance of the remainder of said voltage divider network, said first circuit means comprising actuable means for closing the circuit between the source of potential and the starting circuit with said first circuit means in said first condition and for opening the circuit between the source of potential and the starting circuit with said first circuit means in said second condition, said first circuit means being energizable from a source of electrical energy and while energized being actuable for controlling the energization of the starting circuit, the starting circuit including an ignition switch connected to said switch with said first circuit means being energized from the source of electrical energy by actuation of the ignition switch.

10. The circuit of claim 9 with said sensing circuit means providing a first signal in response to a resistance at said portion having a magnitude greater than the upper limit of said range and a second signal in response to a resistance having a magnitude less than the lower limit of said range and with said first circuit means being placed in said second condition in response to either said first or said second signal.

11. The circuit of claim 10 with said sensing circuit means further cocprising a first controlled conduction device having a pair of first principal electrodes and a first control electrode with said first control electrode being connected to said voltage divider network.

12. The circuit of claim 10 with said actuable means closing the circuit when energized and with said blocking means comprising a second controlled conduction device having a pair of second principal electrodes and a second control electrode with said second principal electrodes being connected across said actuable means whereby when said second device is conductive said actuable means is shunted and not energized and when said second device is nonconductive said actuable means is energized.

13. The circuit of claim 12 with said sensing circuit means further comprising a first controlled conduction device having a pair of first principal electrodes and a first control electrode with said first control electrode being connected to said voltage divider network, said second control electrode being connected to said sensing circuit means with said second device being rendered conductive in response to either said first or said second signal.

14. The circuit of claim 13 with said first device being a transistor and with said second device being a controlled rectifier with said second control electrode connected by one circuit to a principal electrode of said first device to receive said second signal and to said voltage divider network to receive said first signal.

15. The circuit of claim 14 with said actuable means comprising a relay having a pair of contacts in series with the source of electrical potential and the starting circuit and having an actuating coil connected across said second principal electrodes.

16. In a key actuated circuit for actuating a device energizable from a source of electrical potential a switch comprising: first circuit means for controlling the energization of the device and having a first condition for permitting energization of the device and a second condition for preventing energization of the device, said first circuit means including a sensing circuit means for sensing the magnitude of an electrical characteristic at a portion of its circuit and for placing said first circuit means in said first condition in response to an electrical characteristic of a predetermined magnitude, and a member operatively associated with the key and selectively operable on said portion of the circuit of said sensing circuit means for providing said electrical characteristic of said predetermined magnitude, said sensing circuit means responsive to an electrical characteristic at said portion of its circuit of preselected magnitudes different from said predetermined magnitude for placing said first circuit means in said second condition, said first circuit means being energizable from a source of electrical potential and while energized being actuable for controlling the energization of the starting circuit, said first circuit means including blocking means responsive to said sensing circuit means sensing said preselected magnitudes for blocking said first circuit means from responding to subsequent changes in the magnitude of the electrical characteristic at said portion of said sensing circuit.

17. The circiut of claim 16 with said blocking means being taken out of said blocking condition upon deenergization and subsequent energization of said first circuit means.

18. The circuit of claim 17 with the electrical characteristic being an electrical impedance.

References Cited

UNITED STATES PATENTS

| 3,136,307 | 6/1964 | Richard. |
| 3,194,970 | 7/1965 | Claps. |
| 3,215,221 | 11/1965 | Rayman _____ 307—10 X |
| 3,222,534 | 12/1965 | Scott. |

ROBERT K. SCHAEFER, Primary Examiner

T. B. JOIKE, Assistant Examiner

U.S. Cl. X.R.

123—17, 198; 180—114